United States Patent [19]

Lardellier et al.

[11] Patent Number: 5,119,626
[45] Date of Patent: Jun. 9, 1992

[54] COMBINED TUROROCKET AND RAMJET PROPULSION UNIT

[75] Inventors: Alain M. J. Lardellier, Melun; Raymond P. M. Thetiot, Le Mee sur Seine, both of France

[73] Assignee: Societe Nationale d'Etude et de Construction de Moteurs d'Aviation "S.N.E.C.M.A.", Paris, France

[21] Appl. No.: 537,773

[22] Filed: Jun. 14, 1990

[30] Foreign Application Priority Data

Jun. 14, 1989 [FR] France ............... 89 07846

[51] Int. Cl.⁵ .................................. F02K 3/00
[52] U.S. Cl. ........................... 60/244; 60/246; 60/268
[58] Field of Search .............. 60/246, 268, 269, 244, 60/245, 225, 39.162; 415/114

[56] References Cited

U.S. PATENT DOCUMENTS

| | | | |
|---|---|---|---|
| 3,002,340 | 10/1961 | Landerman | 60/246 |
| 3,237,401 | 3/1966 | Peters et al. | 60/246 |
| 3,734,639 | 5/1973 | Short | 415/114 |
| 4,765,135 | 8/1988 | Lardellier | 60/268 |

Primary Examiner—Richard A. Bertsch
Assistant Examiner—Howard Richman
Attorney, Agent, or Firm—Oblon, Spivak, McClelland, Maier & Neustadt

[57] ABSTRACT

A combined turborocket and ramjet propulsion unit comprises an air intake duct, and an air compressor with two counter-rotating rotor stages disposed downstream of the duct in an annular path formed between an outer casing and a central body which is maintained in position relative to the casing by structural arms. The rotor stages of the compressor are driven by a power turbine driven by combustion gases from a gas generator which burns liquid propellants. The power turbine includes two interleaved counter-rotating modules arranged within the central body in a position longitudinally between the two compressor stages which they drive, and the gas generator is disposed axially within the central body to the rear of the turbine modules, the generator supplying the combustion gases to the turbine in an upstream direction through a central ejection chamber and an annular reversing chamber which redirects the gases rearwards through the turbine. The gases from the turbine are discharged into the compressed air stream at the rear of the central body and are subjected to afterburning before discharge through an exhaust nozzle. On changeover to ramjet operation the fuel supply to the gas generator is shut off and is directed instead to fuel injectors disposed in a combustion chamber located in the air flow path downstream of the compressor. The compressor blades are feathered and the fuel is burned in the combustion chamber with the air compressed in the air intake duct.

10 Claims, 2 Drawing Sheets

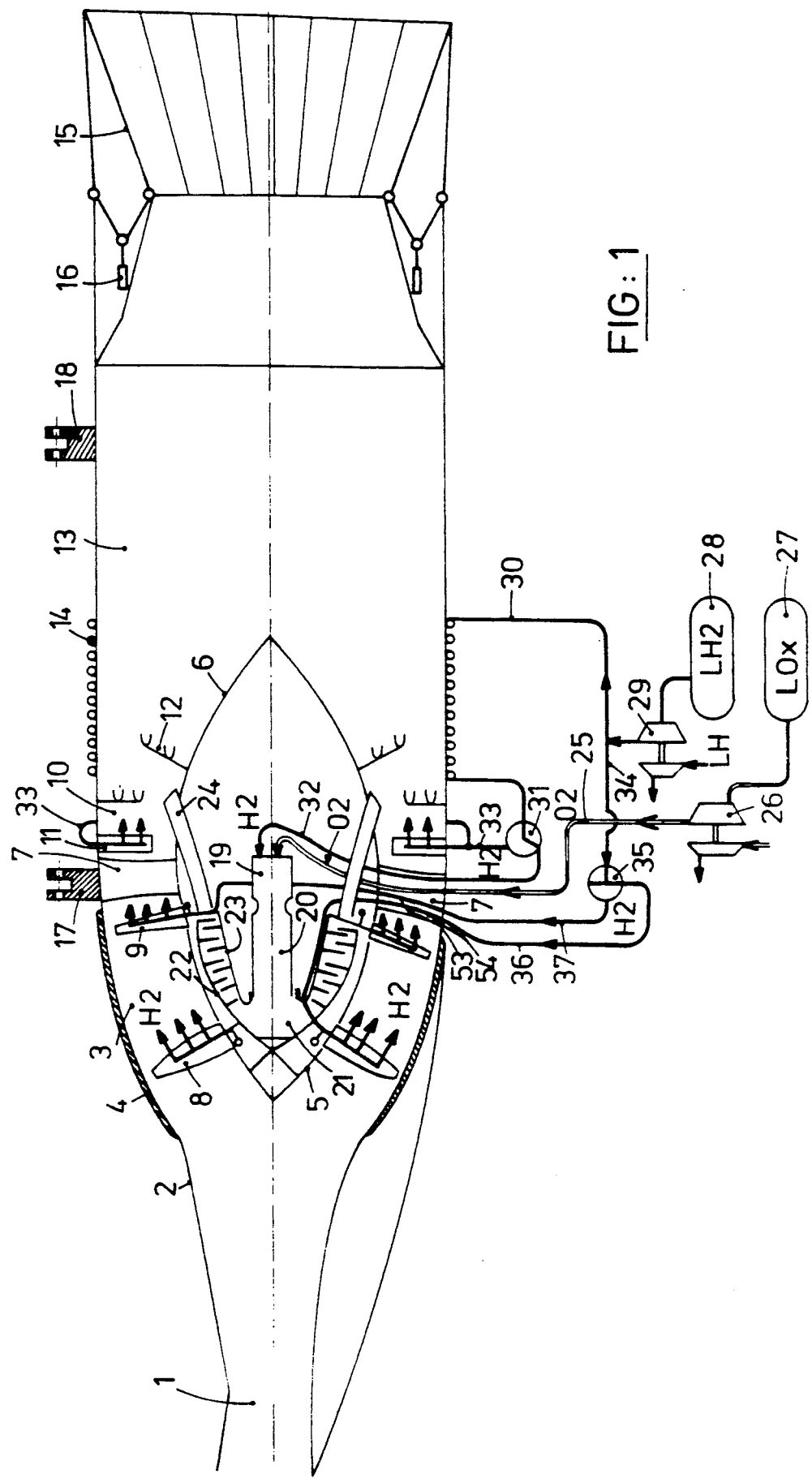
FIG: 1

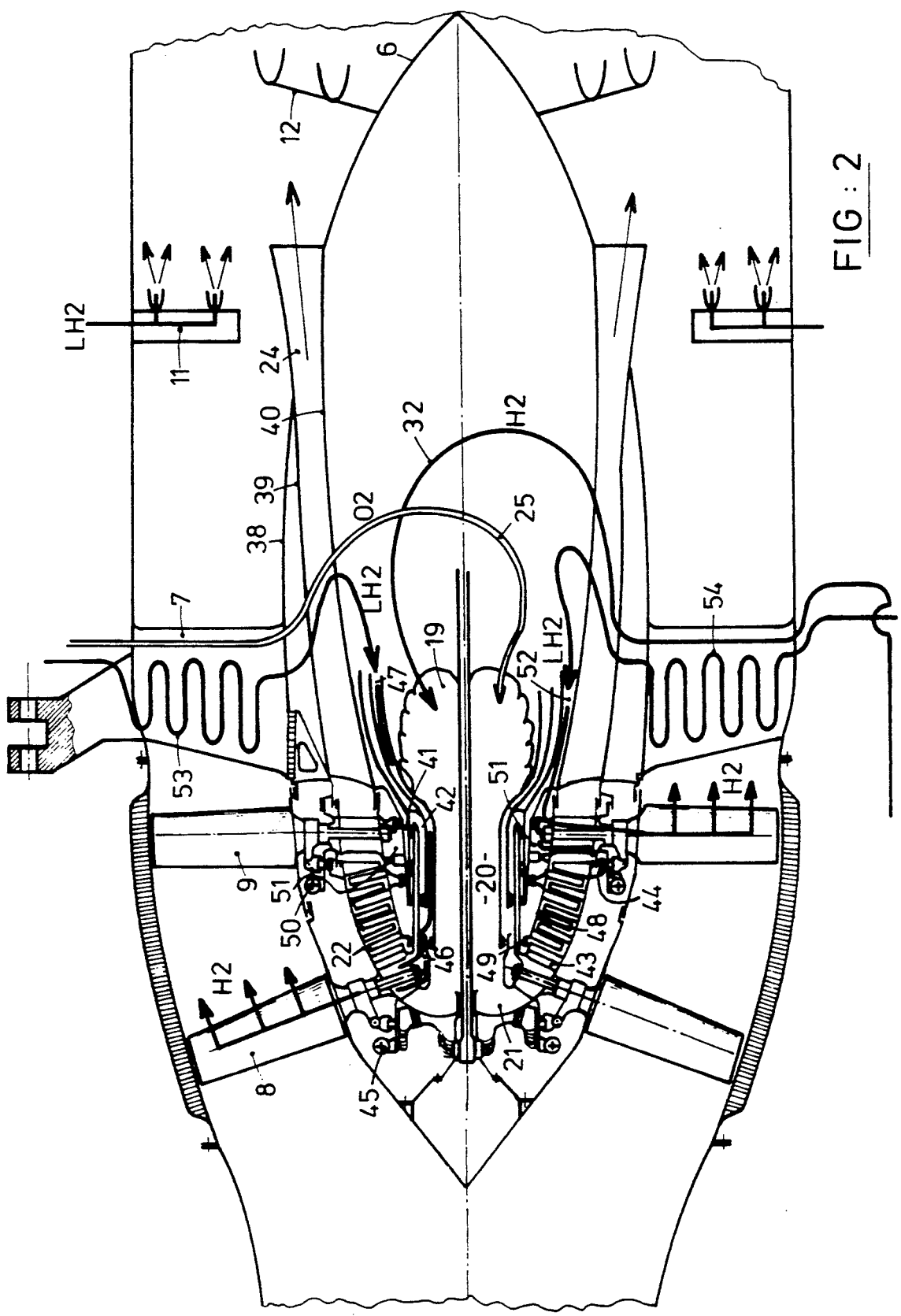
FIG: 2

COMBINED TUROROCKET AND RAMJET PROPULSION UNIT

BACKGROUND OF THE INVENTION

1. Field of the Invention

The present invention relates to a propulsion unit comprising a combined turborocket and ramjet with afterburner.

2. Summary of the Prior Art

Composite or combined propulsion units consisting of a turbojet and a ramjet are already known.

These systems put to good use the differing and complementary qualities of these two types of engine, the first of which is suited for propulsion at relatively low speeds, i.e. subsonic or supersonic speeds up to Mach 2.5 or 3, while the second enables highly supersonic or hypersonic speeds to be reached at the same time as providing good efficiency and low specific fuel consumption.

Engines are also known in which the turbine is not aerodynamically coupled to the compressor. This allows the input of energy to the turbine to be independent of the flow of air through the compressor, and also allows the use of a fuel which ensures efficient conversion of the energy into thrust during the process of expansion through the turbine.

French Patent 2 215 538 describes a combined turbojet-ramjet engine in which a direct-acting, hydrogen-expanding turbine drives an air compressor by means of a central shaft, the turbine being arranged in the central body of the propulsion unit and having means for ejecting the hydrogen thus expanded into the airstream where, mixed with the air, it will then be burnt. For high speeds, the hydrogen is introduced directly into the combustion chamber for ramjet operation and the turbine, which is no longer supplied, simply autorotates.

This device uses a cycle known as an expander cycle, in which the liquid hydrogen is heated to take up energy and then is used b expanding it in the turbine before being burned in the airstream.

U.S. Pat. No. 3,237,400 discloses a turborocket propulsion unit with reheat in which the combustion gases of a central rocket motor drive the turbine and also, by means of a reduction gear, a compressor placed upstream. Such an arrangement is also described in Flight International, Vol. 86, No 2903 (pp 752 to 754) of Oct. 29, 1964.

SUMMARY OF THE INVENTION

It is an object of the present invention to provide a combined turborocket and ramjet propulsion unit in which turborocket operation is shut down and ramjet operation takes over the propulsion role at high supersonic speeds, and in which the design is such as to allow the use of highly efficient counter-rotating turbine and compressor stages for turborocket operation in a compact manner and without reduction gearing for the compressor.

Accordingly, the invention provides a combined turborocket and ramjet propulsion unit comprising an air intake duct, an outer casing and a central body defining an annular path therebetween downstream of said air intake duct, structural arms maintaining said central body in position relative to said outer casing, an air compressor having two counter-rotatable rotor stages disposed in said annular path between said outer casing and said central body, means defining a combustion chamber downstream of said air compressor, fuel injectors disposed in said combustion chamber, a discharge pipe downstream of said combustion chamber, a power turbine for driving said air compressor, said power turbine comprising two interleaved counter-rotatable turbine modules disposed within said central body at a position longitudinally between said two compressor rotor stages driven thereby, a gas generator for burning liquid fuel to produce combustion gases for driving said power turbine, said gas generator being disposed axially within said central body rearwardly of the inlet to said turbine and including a central ejection chamber through which said combustion gases are delivered to said turbine, and a fuel supply circuit including a liquid fuel tank, a pump for delivering liquid fuel from said tank, a heat exchanger disposed on the wall of said discharge pipe for receiving liquid fuel from said pump and coverting said fuel to a gaseous state, first feed means for delivering said gaseous fuel to said gas generator through said structural arms, second feed means for delivering said gaseous fuel to said fuel injectors, and valve means for selectively connecting said first and second feed means to said heat exchanger whereby said gaseous fuel is delivered either to said gas generator for operation of said propulsion unit as a turborocket or to said fuel injectors for operation of said unit as a ramjet.

Preferably the first feed means delivers said fuel to the rear of said gas generator, and the upstream stage of said compressor and the outer turbine module of said power turbine comprise a common drum defining an internal annular chamber for receiving said combustion gases in an axially upstream direction from said central ejection chamber of said gas generator and redirecting said gases to pass rearwardly in a downstream direction through the power turbine modules, said unit including longitudinal ducts which extend from said power turbine through the wall of said central body for discharging said gases from said turbine into said discharge pipe downstream of said combustion chamber.

Preferably the propulsion unit includes an afterburner system for burning the mixture of compressed air and the gases discharged from said turbine through said longitudinal ducts during operation as a turborocket, said afterburning system comprising annular flame stabilizers supported by a tail cone of said central body downstream of the outlet plane of said longitudinal turbine discharge ducts.

The propulsion unit preferably also comprises cooling circuit means for cooling the rotary parts of said power turbine modules, said cooling circuit means using, as the coolant, liquid fuel delivered at low temperature from said fuel supply circuit by said pump thereof.

Preferably the cooling circuit means comprises two cooling circuits in parallel, each circuit serving to cool a respective one of said power turbine modules and including an annular cavity defined by a respective one of said compressor rotor stages, and the blades of said compressor rotor stages are hollow to provide said blades with internal cavities which communicate with said annular cavity of the respective rotor stage to receive liquid fuel therefrom for cooling said blades, said compressor rotor blades having openings along their trailing edge for discharging the coolant fuel from said blades into the compressed air stream upstream of said combustion chamber.

The invention also provides a method of operating the propulsion unit wherein the fuel used is liquid hydrogen and wherein:

from start-up to a flight speed of Mach 3, said hydrogen fuel is supplied in gaseous form to said gas generator together with oxygen, the combustion gases produced in said gas generator drive said power turbine and are discharged into said discharge pipe to mix with the oxygen in the atmospheric air compressed by said compressor, and said gaseous mixture is subjected to afterburning before it is ejected from said discharge pipe;

from Mach 3 to when said unit functions as a ramjet, said valve means of said cooling circuit means is operated to open both of said two cooling circuits in order to cool the rotating parts and the blades of said compressor;

from Mach 4.5 onwards, a transition to ramjet operation is effected by reducing the feed of gases from the gas generator and simultaneously feathering said blades of said compressor while continuing to feed liquid hydrogen to said cooling circuits to cool said blades, the fuel supply circuit valve means is operated to shut off the feed of gaseous hydrogen to said gas generator and to commence the feed thereof to said fuel injectors in said combustion chamber, and the mixture of the air compressed in said air intake duct with the hydrogen discharged from said compressor blades and the hydrogen injected by said fuel injectors is burned in said combustion chamber.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a simplified diagram of one embodiment of the propulsion unit in accordance with the invention.

FIG. 2 illustrates in more detail the construction of part of the propulsion unit shown in FIG. 1.

DESCRIPTION OF THE PREFERRED EMBODIMENT

With reference to FIG. 1, the propulsion unit comprises an air passage formed, from upstream to downstream, by a bi-dimensional air intake 1 of variable cross section, followed by a transitional section 2 which merges with an annular duct 3 formed between an outer casing 4 and a central body 5 having an overall ogival shape of which the rear part ends in a cone 6. The central body 5 is held in position in the casing 4 by structural or supporting arms 7 which are evenly distributed around the periphery of the duct 3. In that part of the duct 3 between the transitional section 2 and the arms 7 there is arranged a compressor with two counter-rotating modules or compressors 8 and 9.

Downstream of the arms 7, the propulsion unit comprises a combustion zone 10 in which are arranged fuel injectors 11 for use during operation of the unit as a ramjet, and an afterburner system 12 comprising flame stabilizing annular baffles carried on the rear cone 6.

The combustion zone is followed by a discharge pipe 13 of which the casing structure includes a heat exchanger 14 for transferring energy to the liquid fuel before its use and thereby cooling the wall of the said discharge pipe. The pipe 13 is followed by an exhaust nozzle 15 of the convergent-divergent type having a variable cross-section controlled by known means, for example by jacks 16 as shown in the drawing.

The casing is fitted with an upstream mounting flange 17 in the region of the structural arms 7, and with a downstream mounting flange 18 at the downstream end of the discharge pipe 13.

In FIG. 1, the internal part of the central body 5 has been shown in simplified form. A liquid propellant rocket motor or gas generator 19 is arranged axially so that it is supplied with the propellants from the rear, generating combustion gases which pass forwards in a fixed, central ejection chamber 20 to an annular upstream chamber 21 which is rotatable and in which the gases from the rocket motor are forced in a downstream direction towards a power turbine formed by two interleaved counter-rotating turbine modules 22, 23. The radially outer turbine module 22 is connected to the upstream module 8 of the compressor, while the inner turbine module 23 is connected to the downstream module 9 of the compressor.

After having driven the turbine modules 22 and 23, the gases from the generator 19 are ejected into the compressed air stream in the region of the combustion zone 10 through longitudinal ducts 24 which pass through the wall of the central body 5. When they enter the compressed air stream, the gases emerging from ducts 24 are enriched in oxygen by the air in this stream and are burnt once again in the region of the flame baffles of the afterburner 12.

If one looks at the propellant supply circuits diagrammatically shown in FIG. 1, one can firstly see that the oxygen needed for the operation of the gas generator 19 is fed to the generator by pipe 25 which passes through the arms 7, the oxygen being pumped by a turbopump 26 from a tank 27. For the sake of simplicity, the drive from the turbine to the pump 26 has not been shown.

The hydrogen circuit comprises a storage tank 28 and a turbopump 29, at the output of which the circuit is split into two branches. The first branch 30 feeds the liquid hydrogen to the heat exchanger 14 of the discharge pipe 13 where, as a result of contact with the hot pipe wall, the hydrogen absorbs energy and becomes gaseous. After leaving the heat exchanger 14, the circuit has a two-way valve 31 which enables one to choose either to supply the gas generator 19 via pipe 32 or, for operation in the ramjet mode, to feed the hydrogen to the injectors 11 via pipe 33.

Downstream of the hydrogen turbopump 29, the second branch 34 of the hydrogen circuit includes a three-way valve 35 by which two cooling circuits or pipes 36 and 37 can be supplied, either separately or in parallel. To explain the importance of these cooling circuits 36 and 37, the structure of the power turbines 22 and 23 and the compressors 8 and 9 will now be described with reference to FIG. 2.

The fixed structure of the central body is formed by an inner exhaust casing 38, and the supporting arms 7, attached both to an outer casing 39 and an inner casing 40 of the turbine outlet and to an outer support 41 for the bearings common to the turbines 22 and 23 as well as to an inner support 42 for the bearing of the turbine 22.

The outer turbine module 22 comprises five stages of inwardly directed blades carried by a drum 43 which is secured at the upstream end to the compressor stage 8 and carries at its rear a labyrinth seal 44.

The vanes of the compressor stage 8 are fitted with a Pitch control mechanism 45, and the axles of the vanes are hollow, opening into an annular enclosure 46 supplied with liquid hydrogen via an annular duct 47 and the inner bearing support of the turbine 22. Above Mach 3, the flow of hydrogen coming from the valve 35 through the duct 47 cools the vanes of the compressor 8 before being discharged into the gas stream through holes drilled in the trailing edges of the vanes to mix in the duct 3 with the hydrogen from the reheating system 11.

The inner turbine module 23 comprises four stages of outwardly directed blades carried by a drum 48 which is secured at its downstream end to the compressor stage 9 and carries at its upstream end a labyrinth seal 49.

The second compressor stage 9 also consists of vanes fitted with a pitch control mechanism 50. As in the case of the first compressor stage 8, the hollow axles of the vanes open into an annular enclosure 51 supplied with hydrogen by an annular duct 52 formed between the inner casing 40 of the turbine outlet and the inner bearing support 42. The vanes of the compressor stage 9 are also drilled with holes along their trailing edges and the hydrogen which has cooled the vanes escapes through these holes to mix in the duct 3 with the hydrogen from the fuel injectors 11.

The two cooling circuits thus described comprise heat exchangers 53 and 54 between the valve 35 and the feed ducts 47 and 52, respectively, the heat exchangers 53 and 54 being formed by coiling the pipes 36 and 37 within the supporting arms 7 (or by any other hollow sinuous structure suited to the supporting arms). In these heat exchangers, the liquid hydrogen is partially heated to a point such that, after being further heated in cooling the rotating parts of the turbines and the compressor vanes, it emerges into the airstream in a gaseous state.

The operation of the propulsion unit is as follows.

For starting and accelerating the unit, the chamber of the rocket motor 19 is fed with oxygen by the turbopump 26 and with hydrogen by the turbopump 29 via the valve 31 and the pipe 32. Ignition is ensured by an electrical or pyrotechnic ignitor. The combustion gases consist of a mixture of $H_2O + H_2 + O_2$ and expand through the turbines 22,23 which drive the two compressors 8 and 9.

Atmospheric air containing oxygen is drawn in through the intake 1 and compressed by the compressor stages 8 and 9 before mixing at the outlet of the duct 24 with the hydrogen-rich gases from the turbines. This mixture is burnt in the afterburner 12.

Above Mach 3, it is necessary to cool the vanes of the compressor stages 8 and 9 as well as the supporting arms 7 of the central body 5. To do this, the hitherto closed valve 35 is opened so as to supply hydrogen via the heat exchangers 53 and 54 to the ducts 47 52 and hence the vanes 8 and 9. The hydrogen, having cooled these components, then escapes through the holes in the trailing edges of the vanes to mix with atmospheric air in the main flow path.

The transition to operation in the ramjet mode is carried out by progressively shutting down the compressor by reducing the output from the turbopumps 26 and 29 to reduce the flow from the gas generator 19 and by means of the simultaneous feathering of the vanes of the compressor 8,9. When the gas generator 19 is shut down, the valve 31 is switched to shut off the supply to the rocket motor 19 and to commence supply to the injectors 11 in the combustion zone 10, while the vanes of the compressor remain cooled and ensure an additional supply of hydrogen to the air stream.

The air compressed in the intake duct 1 mixes with the hydrogen issuing from vanes and self-ignites. It is further enriched with hydrogen by the injectors 11 and is reheated during this afterburning stage.

This construction in accordance with the invention provides a compact and light propulsion unit requiring neither a reduction gear nor flow-straighteners for the compressor. The invention makes use of a high efficiency counter-rotating turbine during operation of the unit as a turborocket while ramjet operation is facilitated by the "transparency" of the compressor when feathered, so providing increased thrust as a result of a reduction in the pressure drop.

Obviously, numerous modifications and variations of the present invention are possible in light of the above teachings. It is therefore to be understood that within the scope of the appended claims, the invention may be practiced otherwise than as specifically described herein.

We claim:

1. A combined turborocket and ramjet propulsion unit, comprising
   an air intake duct,
   an outer casing and a central body defining an annular path therebetween downstream of said air intake duct,
   structural arms maintaining said central body in position relative to said outer casing,
   an air compressor having two counter-rotatable rotor stages disposed in said annular path between said outer casing and said central body,
   means defining a combustion chamber downstream of said air compressor,
   fuel injectors disposed in said combustion chamber,
   a discharge pipe located downstream of said combustion chamber,
   a power turbine for driving said air compressor, said power turbine including two interleaved counter-rotatable turbine modules disposed within said central body at a position longitudinally between said two compressor rotor stages driven thereby,
   a gas generator for burning liquid fuel to produce combustion gases for driving said power turbine, said gas generator being disposed axially within said central body rearwardly of the inlet to said turbine and including a central ejection chamber through which said combustion gases are delivered to said turbine,
   a fuel supply circuit including
      a liquid fuel tank,
      a pump for delivering liquid fuel from said tank,
      a heat exchanger disposed on the wall of said discharge pipe for receiving liquid fuel from said pump and converting said fuel to a gaseous state,
      first feed means for delivering said gaseous fuel to said gas generator through said structural arms, second feed means for delivering said gaseous fuel to said fuel injectors, and valve means for selectively connecting said first and second feed means to said heat exchanger such that said gaseous fuel is delivered to one of said gas generator for operation of said propulsion unit as a turborocket and said fuel injectors for operation of said unit as a ramjet, and cooling circuit means for cooling the rotary parts of said turbine modules, said cooling circuit means using, as the coolant, liquid fuel delivered at low temperature from said fuel supply circuit by said pump thereof wherein said cooling circuit means comprises two cooling circuits in parallel, each circuit serving to cool a respective one of said power turbine modules and including an annular cavity defined by a respective one of said compressor rotor stages and wherein the blades of said compressor rotor stages are hollow to provide said blades with internal cavities which communicate with said annular cavity of the respective rotor stage to receive liquid fuel therefrom for cooling said blades, said compressor rotor blades having openings along trailing edges thereof for discharging the coolant fuel from said blades into the compressed air stream upstream of said combustion chamber.

2. A propulsion unit in accordance with claim 1, wherein said first feed means delivers said fuel to the rear of said gas generator, and wherein the upstream stage of said compressor and the outer turbine module of said power turbine comprise a common drum defining an internal annular chamber for receiving said combustion gases in an axially upstream direction from said central ejection chamber of said gas generator and redirecting said gases to pass rearwardly in a downstream direction through the power turbine modules, said unit including longitudinal ducts which extend from said power turbine through the wall of said central body for discharging said gases from said turbine into said discharge pipe downstream of said combustion chamber.

3. A Propulsion unit in accordance with claim 2, including an afterburner system for burning the mixture of compressed air and the gases discharged from said turbine through said longitudinal ducts during operation as a turborocket, said afterburning system comprising annular flame stabilizers supported by a tail cone of said central body downstream of the outlet plane of said longitudinal turbine discharge ducts.

4. A propulsion unit in accordance with claim 1, wherein said cooling circuit means includes valve means for controlling whether said coolant liquid fuel is delivered to one or other of said two cooling circuits, or to both cooling circuits, or to neither of said cooling circuits.

5. A propulsion unit in accordance with claim 1, wherein each cooling circuit includes a portion which passes in a sinuous manner through at least one of said structural arms for cooling said structural arms.

6. A propulsion unit in accordance with claim 1, wherein the blades of said two compressor stages are variably settable blades, the range of blade settings extending to feathering the said blades for operation of the propulsion unit as a ramjet.

7. A propulsion unit in accordance with claim 1, wherein said air intake duct comprises a bi-dimensional air inlet.

8. A propulsion unit in accordance with claim 7, wherein said air inlet is of variable cross-section.

9. A propulsion unit in accordance with claim 1, wherein said discharge pipe is provided with a convergent-divergent, variable cross-section exhaust nozzle.

10. A propulsion unit in accordance with claim 4, wherein the blades of said two compressor stages are variably settable blades, the range of blade settings extending to feathering the said blades for operation of the propulsion unit as a ramjet.

* * * * *